(12) United States Patent
Van Der Lelij

(10) Patent No.: US 9,108,477 B2
(45) Date of Patent: Aug. 18, 2015

(54) COUPLING DEVICE FOR DIFFERENT LANDING GEARS OF AIRCRAFT

(75) Inventor: Armin Van Der Lelij, Hausham (NL)

(73) Assignee: QUICKLOADING GMBH, Putzbrunn (DE)

( * ) Notice: Subject to any disclaimer, the term of this patent is extended or adjusted under 35 U.S.C. 154(b) by 93 days.

(21) Appl. No.: 13/885,924

(22) PCT Filed: Nov. 17, 2011

(86) PCT No.: PCT/EP2011/070370
§ 371 (c)(1),
(2), (4) Date: May 31, 2013

(87) PCT Pub. No.: WO2012/066085
PCT Pub. Date: May 24, 2012

(65) Prior Publication Data
US 2013/0334791 A1 Dec. 19, 2013

(30) Foreign Application Priority Data
Nov. 19, 2010 (DE) .......................... 10 2010 060 683

(51) Int. Cl.
| B60D 1/07 | (2006.01) |
| B60D 1/02 | (2006.01) |
| B64F 1/22 | (2006.01) |
| B64F 1/10 | (2006.01) |

(52) U.S. Cl.
CPC .. *B60D 1/07* (2013.01); *B60D 1/02* (2013.01); *B60D 1/075* (2013.01); *B64F 1/10* (2013.01); *B64F 1/224* (2013.01)

(58) Field of Classification Search
CPC .............. B60D 1/07; B60D 1/25; B64F 1/224
USPC ........... 280/416.1, 3, 402; 414/426, 428, 429; 180/11
See application file for complete search history.

(56) References Cited

U.S. PATENT DOCUMENTS

| 2,854,251 | A |   | 9/1958 | Able et al. |
| 3,709,522 | A | * | 1/1973 | Olson ........................... 280/453 |
| 4,576,245 | A | * | 3/1986 | Oldani ......................... 180/14.1 |
| 4,955,777 | A | * | 9/1990 | Ineson ........................... 414/426 |

(Continued)

FOREIGN PATENT DOCUMENTS

DE   3642044   6/1988

OTHER PUBLICATIONS

International Search Report for PCT/EP2011/070370 mailed on Mar. 20, 2012.

*Primary Examiner* — Tony Winner
(74) *Attorney, Agent, or Firm* — Hunton & Williams LLP

(57) ABSTRACT

Coupling devices for different landing gears of aircraft are disclosed. In one embodiment, a coupling device for coupling to a landing gear of an aircraft may include a first landing gear adapter that is designed for coupling to a landing gear of an aircraft of a first type. A second landing gear adapter that is designed for coupling to a landing gear of an aircraft of a second type is provided. The second type is different from the first type. A change device is coupled to the first and second landing gear adapters and designed such that optionally the first or the second landing gear adapter can be positioned in an operating position, or location of the coupling device, suitable for coupling to the landing gear. A plurality of second landing gear adapters may be provided and may one at a time be moved into the operating position in a pivoting manner.

20 Claims, 2 Drawing Sheets

(56) References Cited

U.S. PATENT DOCUMENTS

| | | | |
|---|---|---|---|
| 5,071,151 A * | 12/1991 | Irwin | 280/402 |
| 5,381,987 A * | 1/1995 | Carns | 244/50 |
| 5,839,744 A * | 11/1998 | Marks | 280/416.1 |
| 5,890,727 A * | 4/1999 | May | 280/416.1 |
| 5,915,714 A * | 6/1999 | Bell et al. | 280/456.1 |
| 6,315,316 B1 | 11/2001 | Wyant | |
| 6,450,756 B1 * | 9/2002 | Stahancyk et al. | 414/426 |
| 6,837,510 B1 * | 1/2005 | Karls | 280/416.1 |
| 2006/0097106 A1 * | 5/2006 | MacGregor et al. | 244/50 |

* cited by examiner

COUPLING DEVICE FOR DIFFERENT LANDING GEARS OF AIRCRAFT

BACKGROUND OF THE INVENTION

1. Field of the Invention

The invention relates in general to the performance of ground movements of aircraft, that is to say changes in position, using a towing device.

2. Description of Related

Ground movements of aircraft which cannot be accomplished by means of the drive of the aircraft take place by means of external tractors, for example when an aircraft which is ready to take off is to be pushed back from the loading position onto the taxi strip or a change in position between loading positions is required or when it is necessary to convey the aircraft from the loading position to a maintenance position, for example in the hangar. For this purpose, tractors are used which are initially mechanically coupled to the aircraft, generally to the nose landing gear thereof, and then pull or push the coupled aircraft to the desired position. The towing process often takes place by means of a tow bar which is provided with its own chassis, is coupled at one end to the landing gear of the aircraft via a landing gear adapter and is connected at the other end to the tractor. Before or after the towing process the tow bar is transported by the tractor, for example to a new position of use, to or from a tow bar depot and the like.

The tow bar or at least the nose landing gear adapter fastened thereto is tailored to the specific aircraft type to be towed, and therefore, in the case of two or more towing processes of different aircraft types, the appropriate adapter must be installed or a tow bar having the appropriate adapter must be fetched from the depot. In the first case, for this purpose an adapter is fitted to a universal socket of the tow bar and after this retooling the towing process can then be carried out using the appropriate adapter. The retooling is generally very time-consuming, and therefore a large number of tow bars having different pre-installed adapters is preferably kept ready, in particular because, owing to the large spectrum of aircraft weights, correspondingly adapted bar diameters are also required. For this reason, it is also preferable to use tow bars in which a permanently mounted adapter for a specific aircraft type is provided, but this makes it necessary to change the entire tow bar, with a corresponding journey to the depot.

SUMMARY OF THE INVENTION

An object of the invention is to carry out towing processes for ground movements of aircraft of different types more efficiently (more rapidly, more simply and with less inconvenience, yet more reliably).

The object is achieved by a coupling device for coupling to a landing gear, in particular nose landing gear, of an aircraft. The coupling device comprises a first landing gear adapter which is designed for coupling to a landing gear of an aircraft of a first type. The device further comprises a second landing gear adapter which is designed for coupling to a landing gear of an aircraft of a second type which is different from the first type. A changeover device is also provided which is coupled to the first and the second landing gear adapter and designed such that selectively the first or the second landing gear adapter can be positioned in a mechanically stable manner in an operating position suitable for coupling to the landing gear.

The object is also achieved by a coupling method for coupling to a landing gear, in particular nose landing gear, of an aircraft.

The coupling device and the method allow coupling to at least two different aircraft types, the changeover device ensuring mechanically stable positioning in the operating position without complex mounting operations being required, as is the case for example in known towing bars having a single universal socket, such that loose nose landing gear adapters could be mounted in a time-consuming manner, but in particular the mounting is hardly feasible on site or at least the fixing is possible only with considerable effort. By means of the coupling device, retooling for towing processes of different aircraft types can thus be carried out on site quickly and without great effort. Owing to the versatility of the coupling device, the number of tow bars to be provided can also be reduced significantly.

Thus, according to further embodiments, at least one further landing gear adapter can be provided for coupling to the nose landing gear of an aircraft of a further type which is different from the first and the second type, the changeover device being coupled to the at least one further nose landing gear adapter and designed such that selectively the first, the second or the at least one further nose landing gear adapter can be positioned in a mechanically stable manner in the operating position.

The number of further adapters is limited merely by the size of the device, such that many different aircraft types can be covered by a single coupling device, and therefore overall a large portion of the tractor journeys to the tow bar depot can be avoided. In general the number of different tow bars can also be reduced further as a result.

In advantageous embodiments, the flexible handling of the device can be improved further by providing, for each nose landing gear adapter, an adapter socket for coupling to the changeover device. The adapter socket is for example designed such that it is also possible to retool a portion or the entirety of the coupling device for other aircraft types. Thus, the adapters which for example ensure maximum reduction of tractor journeys can be mounted in accordance with the aircraft operation or in accordance with the use of the coupling device.

In a further embodiment, a positioning apparatus is also provided for mechanically stable positioning of the nose landing gear adapter in the operating position. The positioning apparatus, which is provided as part of the changeover device, thus ensures secure fixing of the operating position of the adapter in the diverse conditions of use.

In advantageous embodiments, each adapter socket is designed such that the mechanically stable positioning takes place by mechanical coupling of a particular adapter socket to the positioning apparatus. In this case, the adapter socket can be used simultaneously for rapid and reliable mounting of the adapter and for precise and reliable fixing of the adapter in the operating position. This results in a relatively compact and material-saving construction.

In one embodiment the positioning apparatus comprises a bolt tongue which is in engagement with a particular adapter socket in the operating position and is locked by a bolt. The bolt tongue, which is adapted in shape and size to the adapter sockets, is in engagement with the adapter and thus already determines with a high level of accuracy the operating position for the particular adapter to be fixed in the towing position. The reliable yet rapid locking can take place by means of the bolt.

In a further embodiment, a securing apparatus is also provided which is designed to hold each nose landing gear adapter in a magazine position in a mechanically fixed manner. The magazine position is to be understood to the effect that this characterises a location and position of the adapters which currently are not positioned in the operating position. By securing the adapters which are not immediately required in a magazine position which is reliably secured, possible changes in location of the adapter can be avoided in all operating phases of the coupling device. This applies in particular to the transportation of the coupling device or to the mounting thereof on towing apparatuses. Even when changing over one or more adapters and/or adapter sockets, the location of an uninvolved adapter during the retooling process can be fixed.

In an advantageous embodiment, a pivot apparatus is also provided which is designed such that each nose landing gear adapter can be pivoted from the magazine position into the operating position. In this case, the adapter is thus moved along a precisely determined path in the form of a pivot movement, such that for each adapter there is thus a precise transfer from the magazine position to the operating position.

In an advantageous embodiment, a pivot apparatus is also provided which is designed such that each nose landing gear adapter can be tilted from the magazine position into the operating position. In this case the adapter is moved along a precisely determined tilting or folding plane.

In illustrated embodiments, the coupling device according to the invention is designed such that it can be mounted mechanically reversibly on a tow bar device. Mechanically reversibly is to be understood to the effect that the coupling device is provided as a mounting set which can be mounted on another tow bar device at any time without structural changes. Known tow bars can thus be improved considerably in terms of their function and flexibility of use by retrofitting. In other cases, a tow bar can be retooled quickly and efficiently from one aircraft range for another aircraft range.

In another illustrated embodiment, the coupling device according to the invention is designed such that it is integrated into a tow bar device.

In other embodiments, the coupling device can be mounted mechanically reversibly on a towing vehicle (within the meaning of a technical development so as to be "mountable"). In this context, a towing vehicle is understood to be a vehicle which has a drive and is generally used to tow aircraft, the use of the device according to the invention considerably improving the use of the towing device in this case, too.

Embodiments disclosed herein relate to the inclination at which the adapter is fitted to the pivot bar.

According to a further aspect of the invention, the aforementioned object is achieved by a towing device for ground movements of aircraft of different types, the towing device containing the coupling device. The towing device is a tow bar device or, in other embodiments, a vehicle which has its own drive.

The orientation of the pivot plane will also be described in more detail here in order to allow the adapter to be coupled in the operating position. If pivoting is provided, the last portion of the advance pivoting when positioning the adapter in the operating position will proceed such that the planes are substantially in parallel. This is at most meaningful when there are several adapters on one side of the changeover device. If only one adapter is pivotally fastened to the left and to the right, each adapter can be pivoted into the operating position via his own arm, the pivot axis may be perpendicular to the horizontal and the pivot plane can be parallel to the horizontal plane.

If a plurality of pivot bearings is provided, they are attached at different heights and with different inclinations relative to one another. The pivot axes are then not parallel but this inclination can be compensated by inclined arrangement of the adapters at the corresponding sockets, the compensation being determined by the fact that the adapter pivots parallel, in particular to the bolt tongue, at the time of positioning in the operating position.

BRIEF DESCRIPTION OF THE DRAWINGS

The invention will now be described in more detail by way of embodiments with reference to the schematic drawings.

DETAILED DESCRIPTION OF PREFERRED EMBODIMENTS

Figure 1:
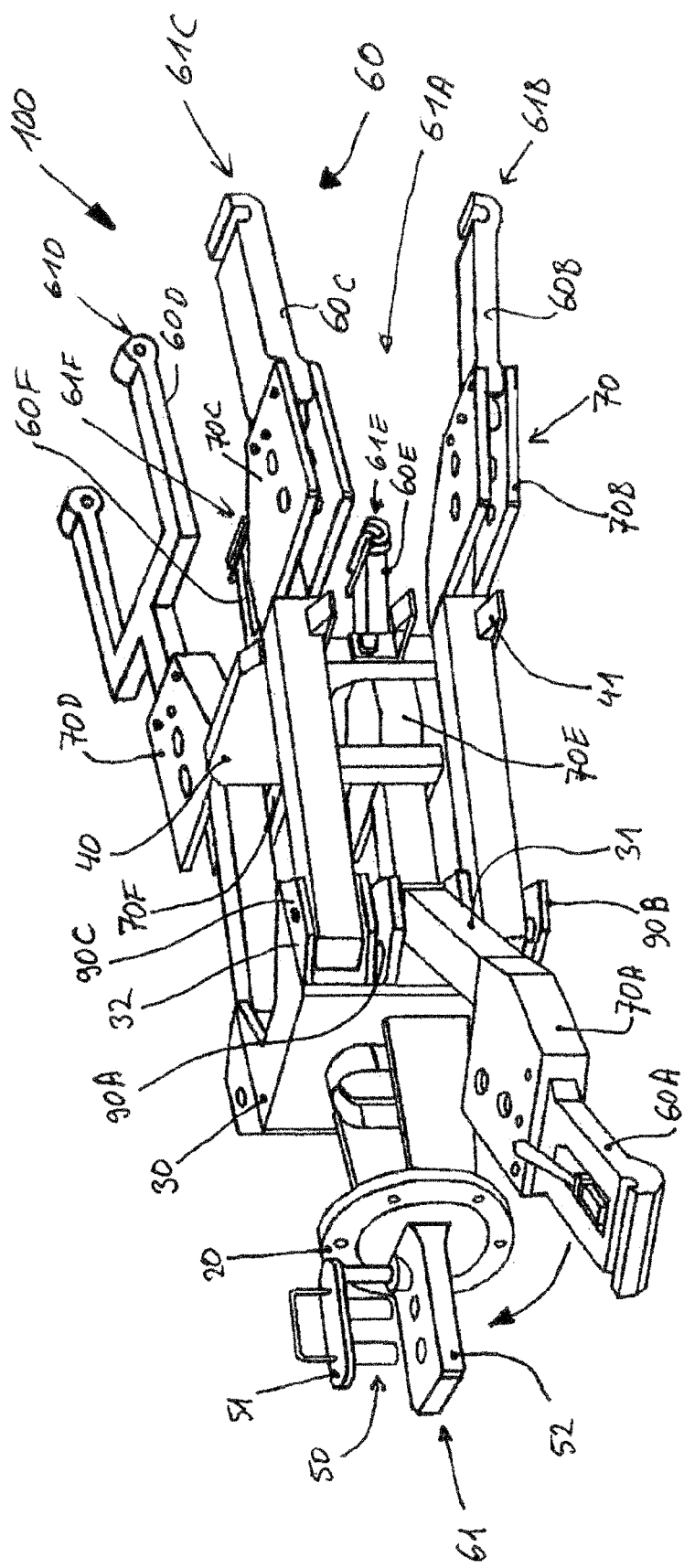
FIG. 1 is a perspective view of a first variant of the coupling device according to the invention.

FIG. 1 is a perspective view of a coupling device 100 which comprises at least two, preferably three or more landing gear adapters 60. In the example shown, the adapters 60A, 60B, 60C, 60D, 60E and 60F are provided, each of which is designed such that it can be mechanically coupled to the landing gear of a specific aircraft type in order to allow a ground movement by pushing or pulling.

The nose wheel of the landing gear of the aircraft is preferred in this context. This would make the adapters nose landing gear adapters, but they are generally suitable for any landing gear of the aircraft.

The adapters 60 are mechanically coupled to a changeover device 30 which comprises pivot apparatuses 90A, 90B, 90C (and others) on a pivot carrier 32 on which pivot arms 31, that is to say one pivot arm for each socket, are rotatably mounted.

Using the changeover device 30, each individual adapter 60 can be brought into an operating position which is shown schematically as position 61 in the drawings and which is structurally designed and adapted to allow coupling to a nose landing gear (not shown). In the representation in FIG. 1, the adapter 60A is located in an intermediate position along a (pivoting) path determined mechanically by the changeover device 30 from a magazine position of the adapter 60A, denoted schematically 61A, to the operating position 61.

The further adapters 60B, . . . , 60F are located in their respective magazine positions 61B, . . . , 61F and can be brought into the operating position by the changeover device 30 as required. Each adapter is therefore allocated a mechanically determined path which makes it possible to change adapters, that is to say allows a transfer from the associated magazine position to the operating position and vice versa, without great effort.

As a result, it is possible to adapt rapidly to different aircraft types at or in the vicinity of the aircraft to be towed, without visiting an adapter depot.

In one embodiment, as shown in FIG. 1, a securing apparatus 40 is provided which reliably holds the adapters 60 including the sockets 70 and the associated pivot arms 31 in the respective magazine positions by means of securing components 41.

In the embodiment shown, adapter sockets 70 are also provided, of which the sockets 70A, . . . , 70D are shown in the drawings. The sockets 70 allow reliable fixing of the adapters 60, for example by means of bolts or other fastening means, such that retooling of the device by exchange can also take place efficiently. The sockets 70 are also designed such that they can be mechanically coupled to a positioning device 50 such that during use the operating position 61 is maintained in a mechanically stable manner by an adapter concerned.

For this purpose, in one embodiment a bolt tongue 52 is provided in conjunction with a bolt 51, which in turn engages in the particular socket 70 and provides reliable mechanical locking.

The positioning device 50 is rigidly connected to the changeover device 30 or is constructed as part of the changeover device and for its part is to be connected by means of a flange 20 to a towing device (not shown in FIG. 1), for example a tow bar. The flange 20 and also the changeover device 30 are designed such that it can be coupled in a stable manner to a specific type of towing device, for example in a mechanically reversible manner, or can be flanged to towing devices of different designs, for example different bar diameters, etc. In other cases, the device 100 is designed such that it is permanently mounted on a towing device without reversible dismounting being possible.

Figure 2:
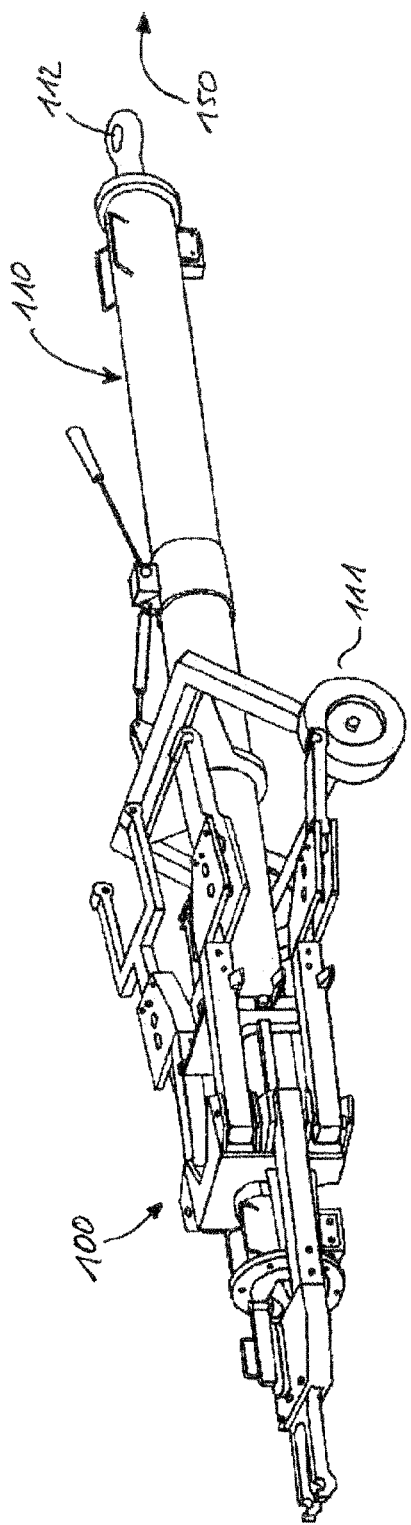
FIG. 2 is a perspective view of a towing device on which the coupling device according to the invention is mounted permanently or mechanically reversibly or releasably.

FIG. 2 is a perspective view of a towing device for example in the form of a tow bar 110 having its own chassis 111 but without a drive, the coupling device 100 being mounted. In other embodiments the towing device 150 is a vehicle (not shown) which has its own drive and which is used by means of the device 100 or 110 for towing aircraft of a different type. The coupling takes place via 112.

When the towing device is used to perform ground movements of aircraft, said device is coupled to the nose landing gear via the appropriately selected adapter 60, which is located in the operating position 61, such that the towing forces are transferred via the adapter 60, the flange 20, the positioning apparatus 30 and finally to the bar 110. In the embodiment shown, the towing forces are then transferred via a coupling to a towing vehicle 150 which has a drive.

Owing to the changeover device and/or the towing device, substantially fewer tow bars are thus required. The tractor journeys to change bars can be reduced significantly. Existing tow bars and tractors can also be retrofitted by means of the coupling device according to the invention.

The invention claimed is:

1. A coupling device for coupling to different types of aircraft landing gears, the coupling device comprising
    a first landing gear adapter (60A) configured for coupling to a first type of landing gear of an aircraft of a first type and coupled to a first pivot apparatus configured to pivot the first landing gear adapter from a magazine position thereof into an operating position;
    a second landing gear adapter (60B) configured for coupling to a second type of landing gear of an aircraft of a second type, different from the first type and coupled to a second pivot apparatus configured to pivot the second landing gear adapter from a magazine position thereof into the operating position;
    a changeover device (30) comprising the first pivot apparatus and the second pivot apparatus and thereby coupled to the first and the second landing gear adapter (60A, 60B), whereby selectively the first (60A) or the second landing gear adapter (60B) is positionable in the operating position that is suitable for coupling the positioned landing gear adapter to the landing gear of each of the first and second aircraft types for mechanically loadable towing of said aircraft.

2. The coupling device according to claim 1, comprising a third landing gear adapter (60C) for coupling to a third type of landing gear of an aircraft of a third type, different from the first and the second type, wherein the changeover device (30) is coupled to the third landing gear adapter and configured to selectively position the first, the second or the third landing gear adapter mechanically loadable at the operating position for a thrust or tensile load of at least 1000 kg.

3. The coupling device according to claim 1 or 2, wherein an individual adapter socket (70A, 70B) couples the changeover device (30) to each landing gear adapter.

4. The coupling device according to claim 1, wherein a positioning apparatus (50) mechanically positions one of the landing gear adapters in the operating position at a time.

5. The coupling device according to claim 4, wherein the positioning apparatus (50) mechanically positions one of the landing gear adapter in the operating position at a time, and wherein the mechanically stable positioning couples each of the adapter sockets to the positioning apparatus (50) at a time.

6. The coupling device according to claim 5, wherein the positioning apparatus (50) comprises a bolt tongue (52) engaging one adapter socket (70, 70B) in the operating position (61) and locking this position by a bolt (51).

7. The coupling device according to claim 1, further comprising a securing apparatus (40) holding each landing gear adapter in a magazine position thereof in a mechanically secured manner.

8. The coupling device according to claim 1, wherein the operating position is at a bolt tongue (52).

9. The coupling device according to claim 1, wherein the coupling device is mounted mechanically reversibly on a tow bar device (110).

10. The coupling device according to claim 1, wherein the coupling device is mounted mechanically reversibly (112) on a towing vehicle (150).

11. The coupling device according to claim 1 which comprises two bearing apparatuses configured to allow tilting of each landing gear adapter from the magazine position thereof into the single operating position on a bolt tongue (52).

12. The coupling device according to claim 1, wherein the pivot apparatuses (90A, 90B) are arranged such that a pivot plane of each pivot apparatus intersects with a right or left edge of the operating portion (52).

13. The coupling device according to claim 1, wherein the pivot apparatuses (90A, 90B) are arranged on two opposing sides of the changeover device (30).

14. The coupling device according to claim 1, wherein each landing gear adapter (60A, 60B) is fitted to a corresponding adapter socket (70A, 70B) in an inclined manner.

15. A towing device for ground movements of aircraft of technically different types, wherein the towing device comprises a coupling device (100) according to claim 1.

16. The towing device according to claim 15 which comprises a chassis (111) and is designed for coupling to a towing vehicle.

17. A method for coupling a towing device to different types of aircraft landing gears, comprising the following steps
    providing a first and at least a second landing gear adapter (60A, 60B) that are configured for coupling to a first type of landing gear for a first aircraft and for coupling to a second type of landing gear for a second aircraft, wherein the landing gear types and the two aircraft are different;
    wherein the second landing gear adapter is different from the first landing gear adapter;
    either the first (60A) or the second landing gear adapter (60B) is pivoted and positioned in a mechanically loadable manner in an operating position (61) and is releasable locked in this operating position suitable for coupling to the particular landing gear, wherein a positioning apparatus (50) comprises a bolt tongue (52) engaging each of the landing gear adapters (60A, 70A) in the operating position (61) and locking the operating position by a bolt (51) individually for each of the adapters.

18. The method according to claim 17, wherein either the second (60B, 70B) or the first landing gear adapter (60A, 70A) in the operating position (61) is released by unlocking and is moved back into a magazine position by being pivoted away from the operating position.

19. A coupling device for coupling to different types of aircraft landing gears, the coupling device comprising
- a first landing gear adapter configured for coupling to a first type of landing gear of an aircraft of a first type
- at least one second landing gear adapter configured for coupling to a second type of landing gear of an aircraft of a second type, different from the first type;
- a changeover device, comprising at least two bearings configured to allow tilting of each landing gear adapter from a magazine position thereof into a single operating position or location on a bolt tongue, for selectively positioning the first or the at least one second landing gear adapter in a mechanically loadable manner at the operating position or location of the coupling device, which position or location being suitable for coupling the positioned landing gear adapter to the landing gear of the first and second aircraft type respectively, and for mechanically loadable towing the aircraft.

20. The coupling device according to claim 19, wherein the bearings are arranged on opposing sides of the changeover device.

* * * * *